Sept. 19, 1967     H. W. METZGER     3,342,068

FLOWMETER

Filed Nov. 18, 1964

INVENTOR.
HAROLD W. METZGER
BY

United States Patent Office 3,342,068
Patented Sept. 19, 1967

3,342,068
FLOWMETER
Harold W. Metzger, Willow Grove, Pa., assignor to Fischer & Porter Company, Warminster, Pa., a corporation of Pennsylvania
Filed Nov. 18, 1964, Ser. No. 412,049
1 Claim. (Cl. 73—209)

ABSTRACT OF THE DISCLOSURE

A flowmeter of the rotameter type comprises a transparent tube having parallel flat faces and a variable area bore. The bore is provided with plugs at both ends, held in place by cup-like caps having transverse openings aligned with transverse passages at either end of the tube. Inlet and outlet assemblies each comprise a first member passing through the transverse openings in the cap and the transverse passage in the tube, and a second member secured to the first member to clamp and seal the transverse passage of the tube. Access to the interior of the tube is provided through passages in the first and second members.

---

This invention relates to flowmeters of variable area type and has particular reference to advantageous structural features thereof.

Meters of the variable area type involve tubes having tapered bores in which floats take vertical positions in dependence upon rate of flow of fluid, either liquid or gas. When direct visual indication is desired, the tubes are of glass and either carry or have associated with them scales indicative of flow rate. The glass tubes have generally been fragile and require mountings which must have various special characteristics. In general it may be said that the mountings must protect the tubes against stresses, must effect tight sealing, and must provide for convenient disassembly for purposes of cleaning, inspection of parts and replacement of parts. Further it is desirable that tubes may be replaced by others of different measurement ranges.

It is desirable from the standpoint of economy that mountings should, to the extent possible, involve duplicate parts not only in the same flowmeter but in flowmeters of different sizes, size being here referred to as not only bore size but length of tube.

The general objects of the invention as well as specific objects relating to details of construction will become apparent from the following description, read in conjunction with the accompanying drawings, in which.

Figures 1, 2, 3:
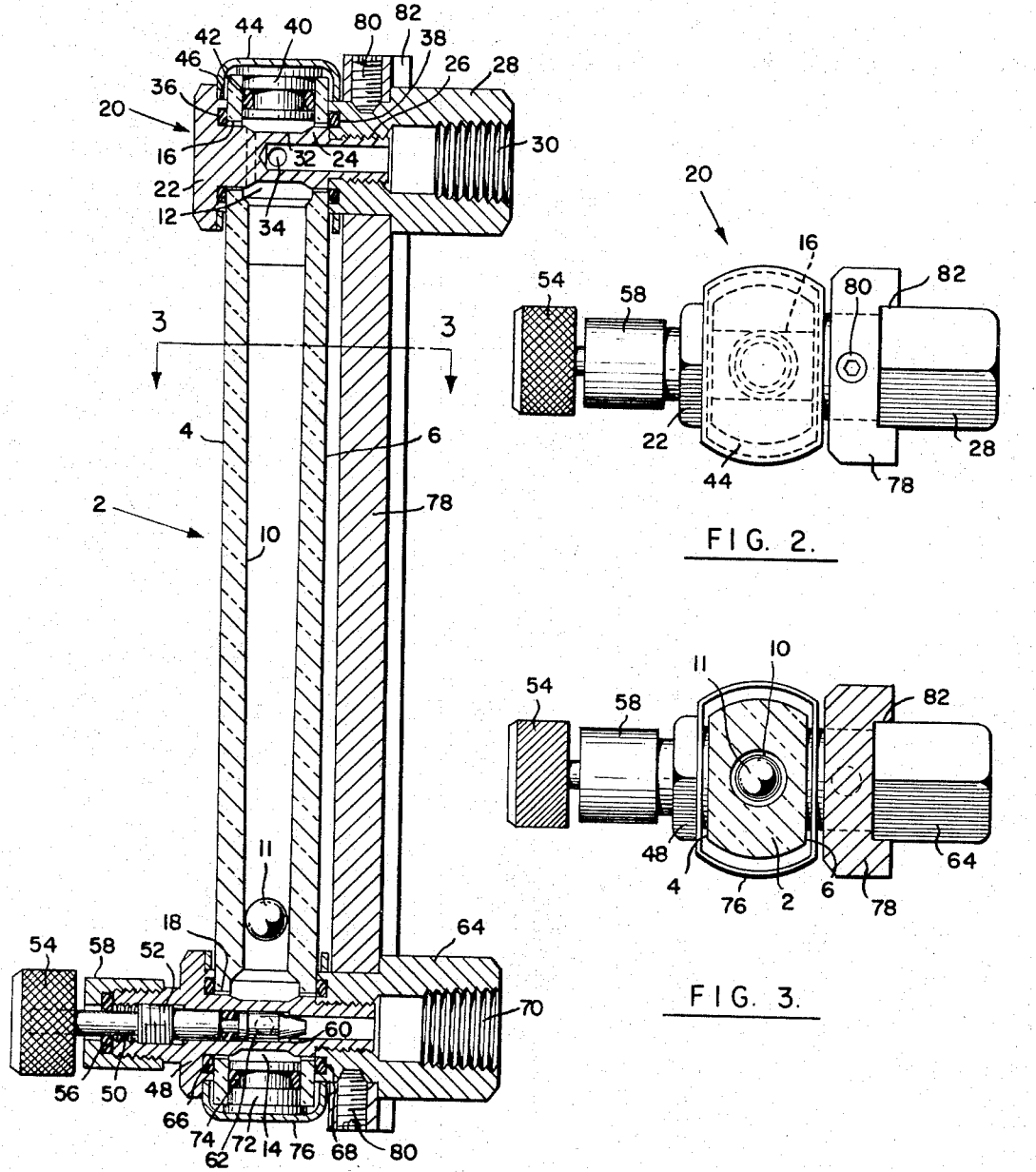
FIGURE 1 is a vertical section through an improved flowmeter provided in accordance with the invention.
FIGURE 2 is a plan view of the same.
FIGURE 3 is a transverse section taken on the plane indicated at 3—3 in FIGURE 1.

The basic element of the improved flowmeter is the tube 2 of glass which, exteriorly, has the shape indicated particularly in FIGURE 3 with two parallel flat faces 4 and 6, the surfaces between these faces being desirably generally cylindrical in form as indicated though their shape is not material. While an associated scale may be provided mounted on a backing plate or otherwise, calibration markings may be etched on the faces 4 and/or 6 and may, in fact, be carried around the cylindrical surfaces. As will appear hereafter, in the case of a set of flowmeter tubes, all of them desirably will have the same exterior shape and other structural aspects as will appear, though they may differ in length. For example, tubes of interchangeable characteristics may have the same external shape with bores having nominal sizes ranging from $1/16$ inch to $1/4$ inch or even more, the structure herein described being particularly advantageous for flowmeters of small bore sizes.

The tubes 2 will have precision molded tapered bores 10 in which are located corresponding so-called floats 11 in conventional fashion. In some meters the floats will consist of spherical balls of stainless steel or other non-corrodible material such as illustrated in FIGURE 1; in other cases the floats may take conventional shapes well known in the art designed, for example, to lead to minimum dependence on viscosity or to other desired properties. For a particular set of tubes it is desirable to provide at the upper and lower ends enlarged extensions of the bore 10 in the form of cylindrical openings 12 and 14, both being of the same diameter. The tubes are provided with upper and lower transverse circular openings 16 and 18, both of these openings also being of the same diameter, the last mentioned openings intersecting the openings 12 and 14 centrally. The foregoing therefore provides identical top and bottom configurations for each tube leading to possibilities of duplication of associated parts.

Attention may now be directed particularly to the assembly of elements at the upper end of the tube 2. The parts about to be described, while shown as formed of metal may be made of suitable resistant plastics. A member 20 is provided with a hexagonal or other head 22 which may be tightened by a wrench and has a shank 24 arranged to pass, desirably with clearance, through the transverse opening 16. It is threaded at 26 to receive the nut member 28 for coupling to an outlet conduit. If this latter is a threaded pipe, the nut 28 is internally threaded as indicated at 30. However, if the coupling is to be made to tubing, a flexible hose, or some other conduit member, the nut may be provided with other coupling means. A series of nuts suitable for the particular couplings involved may be provided for a line of flowmeters. The central portion of the exterior of the shank 24 of member 20 is grooved as indicated at 32, and the shank is transversely drilled as indicated at 34 to provide communication between the interior of the end opening 12 of the tube 2 and its interior bore communicating with the outlet.

For the purpose of assembly and fluid tightness gasket members 36 and 38 are provided in grooves in the members 20 and 28. These gasket members may be provided by compressible O-rings, or the like, and when assembly is provided as indicated these form fluid tight cushions against the flat walls of the glass tube to prevent mechanical damage in assembly and also shielding the tube against vibration which might produce cracking.

The upper end of the opening 12 is sealed by the introduction of a member 40 which may be of metal or plastic provided with an annular groove to receive an O-ring or other annular packing element indicated at 42. In order to protect the upper end of the tube 2 and also retain in position the member 40 against internal pressure in the bore 10 a cap member 44 is provided having a cup-like shape with walls having transverse openings 46 to receive portions of the members 20 and 28 adjacent to the tube 2 so that the cap 44 is held in its desired position. Even though it may be loosely held this will suffice to effect its purposes indicated above.

In many cases assembled elements dimensionally the same as those just described may be provided at the lower end of the tube 2, but to illustrate the modification involved if a needle valve is provided at the lower end of the tube a different assembly is illustrated replacing the member 20. In this case a body 48 is used having an axial bore internally threaded at 50 to receive the threaded shank 52 of a needle valve member having a shank provided with a knob 54, packing being effected as indicated at 56 confined by a cap 58. The end of the needle valve element cooperates with a seat 60 to close off communication between the right-hand end of the bore and the transverse opening 62 communicating with the opening 14 in the lower end of the tube 2. The nut member 64 is identical with the nut member 28 and assembly is provided as will be obvious with the use of packings 66 and 68 corresponding to the packings at 36 and 38. Threads 70 (or other arrangement) provide for connection to an inlet conduit. A closure member 72 provided with a packing ring 74 and a protective and retaining cap 76 correspond to, and are identical with, the elements at the top of the tube. It will be evident that except for the provision of a valve body instead of merely a connecting element 22 the assemblies at the two ends of the tube 2 are identical.

While a flowmeter as just described could well be complete in itself and might be mounted on a support by a clamp or the like or merely by plastic pipes secured in the members 28 and 64, it will usually be desirable not to depend solely on the glass tube 2 as a connector between the end coupling assemblies because of the possibility of breakage. It is accordingly generally desirable to provide a rigid mounting member such as indicated by the plate 78 having openings receiving cylindrical portions of the members 28 and 64 secured therein by means of set screws 80. A plate such as 78 may be provided with flanges providing sockets to engage the flats on a hexagonal or other exterior of the members 28 and 64 to prevent turning and thereby facilitate disassembly by turning of the members such as 20 and 48. In many cases a number of flowmeters of this type are asembled in use, and in such case a plate 78 may be provided with multiple sets of openings for mountings of the type just indicated.

When single flowmeters are involved, it will be evident that if different tube lengths are used but other dimensions are the same for the ends of different tubes, there need only be provided various mounting plates 78 for the several lengths which may be involved.

The various advantages of the described construction will now be a apparent:

Fast and easy removal of the metering tube for cleaning and servicing is possible; and removal of the tube exposes all pressure seals for rapid inspection or replacement. No additional disassembly is required nor are special tools needed.

The elements of the assemblies are simple and inexpensive, all having functional design.

The glass tube body provides maximum visual readability for its length so that the end assemblies occupy a minimum of vertical space. The float position may be easily read from any position within the 180° arc in front of the meter.

All of the sealing arrangements are such that the meter may be used in either pressure or vacuum systems.

The seals not only function as such, but serve to protect the glass against damage by vibrations or shocks.

It will be evident that various details of structure may be modified without departing from the invention as defined in the following claim.

What is claimed is:

A flowmeter comprising a tube having a bore having cross sections varying along its length, a float in said bore, end assemblies providing inlet and outlet connections with the bore at its ends, said tube at at least one end thereof having parallel flat faces with aligned openings therein providing a transverse passage, the corresponding end assembly comprising a first member extendible into said passage, a plug member closing the end of said bore, a cap member with walls having transverse openings aligned with said transverse passage, said cap member extending across the end of said bore to hold said plug member therein, and a second member secured to said first member to clamp the end of the tube therebetween, one of said members having an opening therein communicating with said bore for flow of fluid, and at least one of said first and second members extending through at least one of said transverse openings in the walls of said cap member, and holding said cap member in place against said plug member.

References Cited

UNITED STATES PATENTS 3,100,496 8/1963 Reiser _____ 137—111
3,174,338 3/1965 Bower et al. _____ 73—332

FOREIGN PATENTS 1,213,287 10/1959 France.

OTHER REFERENCES

Kontes' Catalog FM–1. Received by U.S. Patent Office Aug. 16, 1963. Cover and pages 10–13 relied on.

F. W. Dwyer Manufacturing Co. Bulletin No. 7–22. March 1963. Front page relied on.

"New Instruments," In The Review of Scientific Instruments. 28(2): p. 103. February 1962.

JAMES J. GILL, *Acting Primary Examiner.*

RICHARD C. QUEISSER, *Examiner.*

J. C. GOLDESTEIN, *Assistant Examiner.*